(12) United States Patent
Ruffenach et al.

(10) Patent No.: US 8,776,848 B2
(45) Date of Patent: Jul. 15, 2014

(54) TIRE FOR VEHICLE, COMPRISING A TREAD, COMPRISING PLURALITY OF COMPOUNDS AND A CARCASS REINFORCEMENT FORMED OF AT LEAST TWO LAYERS

(75) Inventors: Jean-Marc Ruffenach, Cebazat (FR); Alain Valle, Cebazat (FR); Luc Bestgen, Chatel-Guyon (FR); Pascal Prost, Riom (FR)

(73) Assignees: Michelin Recherche et Techniques S.A., Granges-Paccot (CH); Compagnie Generale des Etablissements Michelin, Clermont-Ferrand (FR)

(*) Notice: Subject to any disclaimer, the term of this patent is extended or adjusted under 35 U.S.C. 154(b) by 403 days.

(21) Appl. No.: 13/042,176

(22) Filed: Mar. 7, 2011

(65) Prior Publication Data

US 2011/0214791 A1 Sep. 8, 2011

Related U.S. Application Data

(60) Provisional application No. 61/349,374, filed on May 28, 2010.

(30) Foreign Application Priority Data

Mar. 5, 2010 (FR) ..................................... 10 51609

(51) Int. Cl.
*B60C 9/08* (2006.01)

(52) U.S. Cl.
USPC ........ 152/209.5; 152/548; 152/560; 152/531; 152/550; 152/564; 152/556; 152/209.11

(58) Field of Classification Search
USPC ................. 152/548, 552, 556, 557, 558, 560, 152/209.5, 531, 550, 564, 209.11
IPC ......................................................... B60C 9/08
See application file for complete search history.

(56) References Cited

U.S. PATENT DOCUMENTS

| 4,890,659 A | * | 1/1990 | Harakon et al. | ............... 152/531 |
| 2006/0207701 A1 | * | 9/2006 | Tanaka | ....................... 152/209.5 |
| 2007/0137747 A1 | | 6/2007 | Yoshida | |

FOREIGN PATENT DOCUMENTS

| EP | 0 905 546 | 10/1999 | |
| EP | 1 800 906 | 12/2006 | |
| JP | 08108704 A | * 4/1996 | ................. B60C 9/04 |

OTHER PUBLICATIONS

English Language Machine Translation of JP08-108704, 1996.*

*Primary Examiner* — Justin Fischer
*Assistant Examiner* — Philip N Schwartz
(74) *Attorney, Agent, or Firm* — Cozen O'Connor

(57) ABSTRACT

A tire for a motorized two-wheeled vehicle, comprising a carcass-type reinforcing structure formed of at least two layers of reinforcing elements, and comprising underneath the tread a crown reinforcement structure comprising at least one layer of reinforcing elements. At least the tread surface comprises a first polymeric compound extending in at least the region of the equatorial plane and at least one second polymeric compound having physicochemical properties different from those of said first polymeric compound, the reinforcing elements of said two or more layers forming the carcass-type reinforcing structure forming angles with the circumferential direction of between 70° and 85° and the distance between the reinforcing elements of each of said two or more layers forming the carcass-type reinforcing structure being not more than 0.5 mm across at least 60% of the axial width of at least one region composed of the second polymeric compound.

10 Claims, 3 Drawing Sheets

TIRE FOR VEHICLE, COMPRISING A TREAD, COMPRISING PLURALITY OF COMPOUNDS AND A CARCASS REINFORCEMENT FORMED OF AT LEAST TWO LAYERS

RELATED APPLICATIONS

This application claims priority from French Patent Application No. 10/51609 filed Mar. 5, 2010 and U.S. Provisional Patent Application Ser. No. 61/349,374 filed May 28, 2010, the entire content of both of which are hereby incorporated by reference.

FIELD OF THE INVENTION

The invention relates to a tire intended to be fitted to a vehicle and more particularly intended to be fitted to a two-wheeled vehicle such as a motorcycle.

Although not limited to such an application, the invention will be described more particularly with reference to a tire for a motorcycle, or motorbike.

BACKGROUND OF THE INVENTION

As in the case of all other tires, there is a trend towards the use of radial motorcycle tires, the architecture of such tires comprising a carcass reinforcement formed of one or two layers of reinforcing elements making an angle with the circumferential direction which can be between 65° and 90°. Said carcass reinforcement is surmounted radially by a crown reinforcement formed of reinforcing elements. The invention also relates to partially radial tires—that is, tires in which the reinforcing elements of the carcass reinforcement are radial in at least part of said carcass reinforcement, for example in the part corresponding to the crown of the tire.

Many architectures have been proposed for the crown reinforcement, depending on whether the tire is to be mounted at the front of the motorbike or at the rear. A first structure for said crown reinforcement involves using only circumferential cables, and said structure is more particularly used for the rear position. A second structure, directly inspired by the structures often used on tires for passenger vehicles, has been used to improve wear resistance, and involves using at least two working crown layers of reinforcing elements which are approximately parallel to each other within each layer but intersect from one layer to the next, forming acute angles with the circumferential direction, such tires being especially suitable for the front of a motorbike. Said two working crown layers may be accompanied by at least one layer of circumferential elements, usually obtained by helically winding a band of at least one rubber-coated reinforcing element.

Which architecture is selected for the tire crown directly affects certain properties of the tire such as wear, endurance, grip, or ride comfort or, in the case of motorcycles in particular, stability. However, other tire parameters such as the type of rubber compounds forming the tread, also affect the properties of said tire. The selection and type of rubber compounds forming the tread are, for example, essential wear property-related parameters. The selection and type of rubber compounds forming the tread also affect the tire's grip properties.

SUMMARY OF THE INVENTION

It is an object of the invention to provide a tire for a motorized two-wheeled vehicle in which the wear and grip properties of the tread of said tire are improved.

This object has been achieved according to an aspect of the invention directed to a tire comprising a carcass-type reinforcing structure formed of at least two layers of reinforcing elements and anchored on each side of the tire to a bead whose base is intended to be mounted on a wheel rim seat, each bead being continued radially outwardly by a sidewall, the sidewalls being joined radially outwardly to a tread, and comprising underneath the tread a crown reinforcement structure comprising at least one layer of reinforcing elements, at least the tread surface comprising a first polymeric compound extending in at least the region of the equatorial plane and at least one second polymeric compound having physicochemical properties different from those of said first polymeric compound, the reinforcing elements of said two or more layers forming the carcass-type reinforcing structure forming angles with the circumferential direction of between 70° and 85° and the distance between the reinforcing elements of each of said two or more layers forming the carcass-type reinforcing structure being not more than 0.5 mm across at least 60% of the axial width of at least one region composed of the second polymeric compound.

The longitudinal direction of the tire, or circumferential direction, is the direction corresponding to the periphery of the tire and is defined by the direction in which the tire rolls.

The transverse or axial direction of the tire is parallel to the axis of rotation of the tire.

The axis of rotation of the tire is the axis about which it rotates in normal use.

A circumferential plane or circumferential cutting plane is a plane perpendicular to the axis of rotation of the tire. The equatorial plane is the circumferential plane passing through the centre or crown of the tread and therefore in the central part of the tread.

A radial or meridian plane contains the axis of rotation of the tire.

The radial direction is a direction that intersects the axis of rotation of the tire and is perpendicular to this axis. The radial direction is the intersection between a circumferential plane and a radial plane.

The axial width of a region formed by the second polymeric compound is measured in a meridian profile in the axial direction between the edges of said region, when the tire is mounted on its service rim and inflated to its recommended pressure.

The distance between the reinforcing elements of each of said two or more layers forming the carcass-type reinforcing structure is measured from reinforcing element to reinforcing element—that is, between the reinforcing element of a first layer and the reinforcing element of a second layer of the carcass-type reinforcing structure. In other words, this distance covers the respective thicknesses of the rubber calendering compounds of each of the plies between said cords.

This distance is measured between two reinforcing elements of each of the layers in the orthogonal projection of a point on the radially outermost curvilinear abscissa of the radially innermost layer of reinforcing elements onto the radially innermost curvilinear abscissa of the radially outermost layer of reinforcing elements. In a meridian plane, the radially innermost and outermost curvilinear abscissae of a layer of reinforcing elements of the carcass-type reinforcing structure are defined by all of the reinforcing elements of a given layer.

The tread of the tire according to an embodiment of the invention therefore comprises, at least at the surface, a central circumferential part or strip comprising a first polymeric compound, and at least two lateral parts or strips of another polymeric compound. The lateral strips are advantageously identical in order to produce a symmetrical tire, that may in certain embodiments be composed of different compounds. The central circumferential part or strip extends axially, in accordance with the invention, over a region containing the equatorial plane.

In an advantageous embodiment of the invention, in order to give the tire symmetrical properties, the central circumferential strip is advantageously centered on the equatorial plane. In other embodiments, intended for example for tires designed for use on a circuit in which most of the bends are in the same direction, the central circumferential strip may not be centered on the equatorial plane.

Advantageous variants of the invention may involve the presence of five or more circumferential strips to form at least the tread surface and thus give a gradual progression of the properties of said tread from the equatorial plane towards the shoulders. As before, such an embodiment may or may not be symmetrical about the equatorial plane, the distribution of the strips differing either in composition or in distribution about the equatorial plane.

In a preferred embodiment of the invention, the second polymeric compound is of a different composition from that of the first polymeric compound and also preferably the second polymeric compound has grip properties superior to those of said first polymeric compound.

In other embodiments, different properties may be obtained with identical compounds by means of differing curing conditions.

According to an embodiment of the invention, the second polymeric compound has a Shore A hardness different to that of the first polymeric compound.

The Shore A hardness of the polymeric compounds after curing is measured according to standard ASTM D 2240-86.

Other properties of the second polymeric compound may be different. As an example, the color may be different in order to give a functional and/or styling effect.

In addition, according to an embodiment of the invention, the reinforcing elements of said two or more layers forming the carcass-type reinforcing structure form angles with the circumferential direction of between 70° and 85° and the radial distance between the reinforcing elements of each of said two or more layers forming the carcass-type reinforcing structure is not more than 0.5 mm across at least 60% of the axial width of at least one region composed of the second polymeric compound.

A tire constructed in this way according to an embodiment of the invention has better performance in terms particularly of wear and grip, owing in particular to the choices made as regards the polymeric compounds forming the tread. In addition, the choice of the angles formed by the reinforcing elements of said two or more layers forming the carcass-type reinforcing structure also improves the grip properties in the tread regions corresponding to the second polymeric compound. The distance between the reinforcing elements of each of said two or more layers forming the carcass-type reinforcing structure, which is not more than 0.5 mm across at least 60% of the axial width of at least one region composed of the second polymeric compound further helps to improve the grip properties in the tread regions corresponding to the second polymeric compound.

Furthermore, the distance between the reinforcing elements of each of said two or more layers forming the carcass-type reinforcing structure which is not more than 0.5 mm is advantageously obtained with two layers comprising different calendering thicknesses. In the case of a tire comprising two layers forming the carcass-type reinforcing structure of different lengths, the longer layer advantageously comprises the thinner calendering thicknesses, which can result in a weight reduction of the tire. Such a weight reduction of the tire can also result in improved tire performance, especially in terms of driving comfort and rolling resistance.

Preferably, according to an embodiment of the invention, the distance between the reinforcing elements of each of said two or more layers forming the carcass-type reinforcing structure is more than 0.2 mm across at least 60% of the axial width of at least one region composed of the second polymeric compound.

For distances of less than 0.2 mm between the reinforcing elements, the driving comfort of the vehicle may be reduced because of the reduction in the relative movements of the crossed reinforcing elements of each of the layers of the carcass structure.

An advantageous variant of the invention provides that the density of reinforcing elements in the radially innermost carcass reinforcing layer is less than the density of reinforcing elements in the radially outermost carcass reinforcing layer. Advantageously again according to the invention there is an increasing gradient in the density of reinforcing elements from one layer to the next when starting with the radially innermost layer.

In a first embodiment of the invention, the tire being intended to be fitted to the rear wheel of the vehicle, the region of the tread surface formed by the first polymeric compound has an axial width of between 15 and 30% of the axial width of the tread.

As explained earlier, the axial width of the tread is measured on a meridian profile in the axial direction between the edges of the tread, when the tire is mounted on its service rim and inflated to its recommended pressure.

A tire intended to be fitted to the rear wheel of a motorcycle is more particularly sensitive to wear when traveling in a straight line; the tire thus proposed by the invention in this first embodiment, with a more wear-resistant polymeric compound, greatly improves the performance in terms of wear. The polymeric compound of the lateral parts of the tread, meanwhile, is advantageously effective in terms of grip properties.

In a second embodiment of the invention, the tire being intended to be fitted to the front wheel of the vehicle, the region of the tread surface formed by the first polymeric compound has an axial width of between 45 and 70% of the axial width of the tread.

A tire intended to be fitted to the front wheel of a motorcycle is less sensitive to centre wear than one intended to be fitted to the rear wheel. The tire thus proposed in this second embodiment comprises advantageously a tread comprising polymeric compounds whose wear-related properties are less than those of the compounds of the tire intended to be fitted to the rear wheel. The central part of the tread is thus relatively wide and the lateral parts advantageously comprise a polymeric compound with high grip properties.

As an example, the polymeric compound of the central part of the tire intended to be fitted to the front wheel has properties approximately equivalent to those of the polymeric compound forming the lateral parts of the tire intended to be fitted to the rear wheel.

An advantageous variant of the invention provides that the crown reinforcement structure comprises at least one layer of circumferential reinforcing elements.

Preferably again, the reinforcing elements of the layer of circumferential reinforcing elements have an elastic modulus greater than 6000 N/mm$^2$.

Also preferably, the reinforcing elements of the layer of circumferential reinforcing elements are metallic and/or textile and/or glass.

In a variant of the invention, the crown reinforcement structure comprises at least two layers of reinforcing elements and from one layer to the next the sections form angles with each other of between 20° and 160°.

In a preferred embodiment of the invention, the reinforcing elements of the working layers are made of textile material.

In another embodiment of the invention, the reinforcing elements of the working layers are made of metal.

BRIEF DESCRIPTION OF THE DRAWINGS

FIGS. 1 to 3 are not shown to scale, for ease of understanding.

DETAILED DESCRIPTION OF THE DRAWINGS

Figure 1:
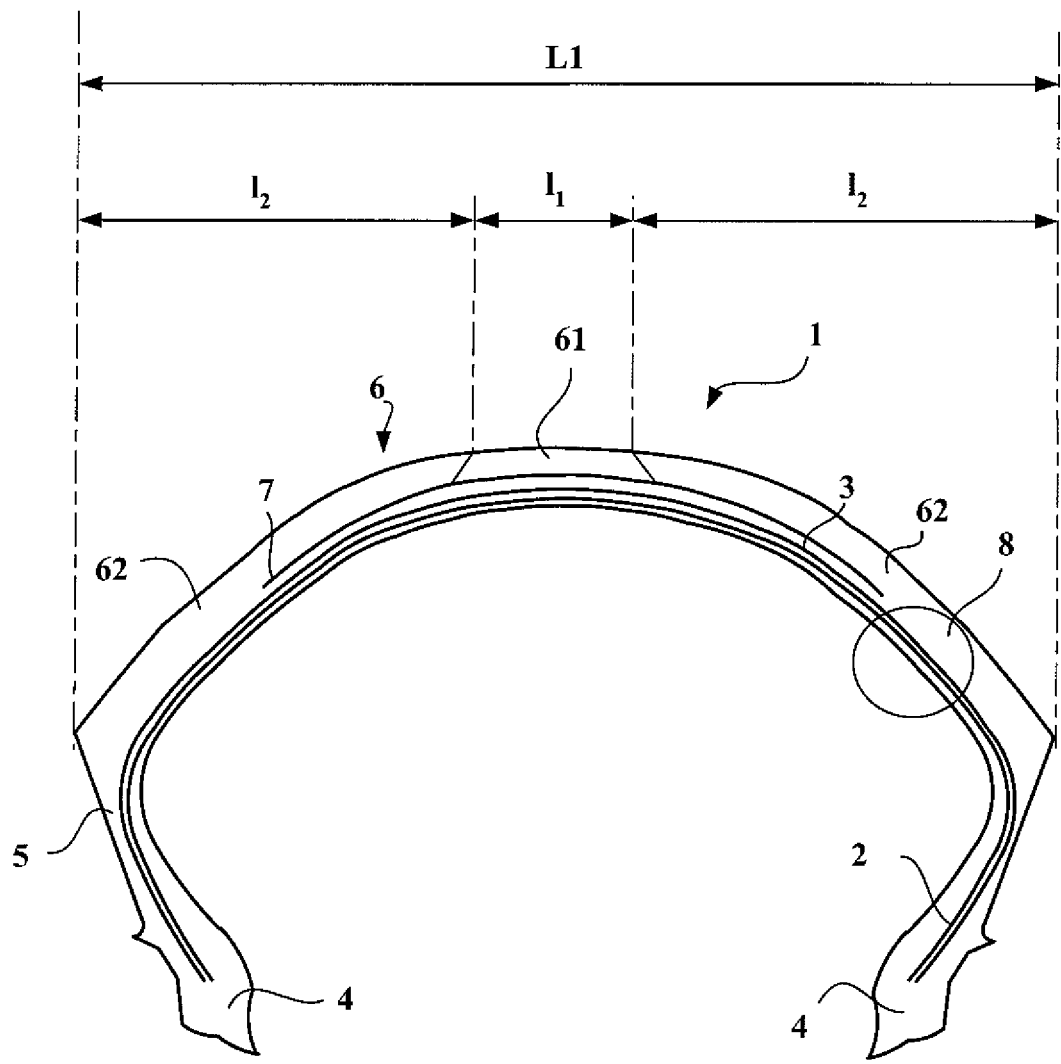
FIG. 1, a meridian view of a diagram of a tire in a first embodiment of the invention, FIG. 2, an enlarged partial view of part of the FIG. 1 diagram, FIG. 3, a meridian view of a diagram of a tire in a second embodiment of the invention.

FIG. 1 shows a type 190/50 ZR 17 tire 1 intended to be fitted to the rear wheel of a motorcycle and comprising a carcass reinforcement comprising two layers 2, 3 comprising reinforcing elements of textile type, more specifically aliphatic polyamide 140 tex/2. The layers 2, 3 of the carcass reinforcement comprise reinforcing elements forming an angle with the longitudinal direction of the tire in the equatorial plane equal to 80° and intersecting from one layer to the next.

The layers 2, 3 of the carcass reinforcement are anchored on each side of the tire 1 in a bead 4 whose base is intended to be fitted to a rim seat. Each bead 4 is continued radially outwardly by a sidewall 5, said sidewall 5 being joined radially outwardly to the tread 6.

The tire 1 also has a crown reinforcement comprising a layer 7 of circumferential reinforcing elements made of textile material, more precisely aromatic polyamide 167 tex/2.

The layer of circumferential reinforcing elements 7 advantageously comprises a single thread wound to form an angle with the longitudinal direction approximately equal to 0°. The layer of circumferential reinforcing elements 7 may also be produced by the simultaneous winding of a plurality of bare threads or in the form of bands when embedded in rubber.

The tread 6 comprises, in accordance with the invention, a first rubber compound 61 in its central part and a second rubber compound 62 in the lateral parts. The transition zones between the parts 61 and 62 forming the tread 6 are advantageously formed progressively with a bevel interface, the angle of the bevel being between 20° and 60° relative to the outside tread surface 6 of the tire 1.

The rubber compound 62 is advantageously chosen such that its grip properties are superior to those of the rubber compound 61, said rubber compound 61 being more particularly chosen for its wear resistance. The resulting tread can define an advantageous wear resistance/grip compromise by comparison with what can be achieved with a single rubber compound.

The axial width $I_1$ of the central part corresponding to the rubber compound 61 is equal to 41 mm and represents approximately 22% of the axial width L1 of the tread, which is equal to 188 mm.

The axial widths $I_2$ of each of the lateral parts corresponding to the rubber compound 62 are identical and equal to 73.5 mm and represent approximately 39% of the axial width L1 of the tread.

Figure 2:
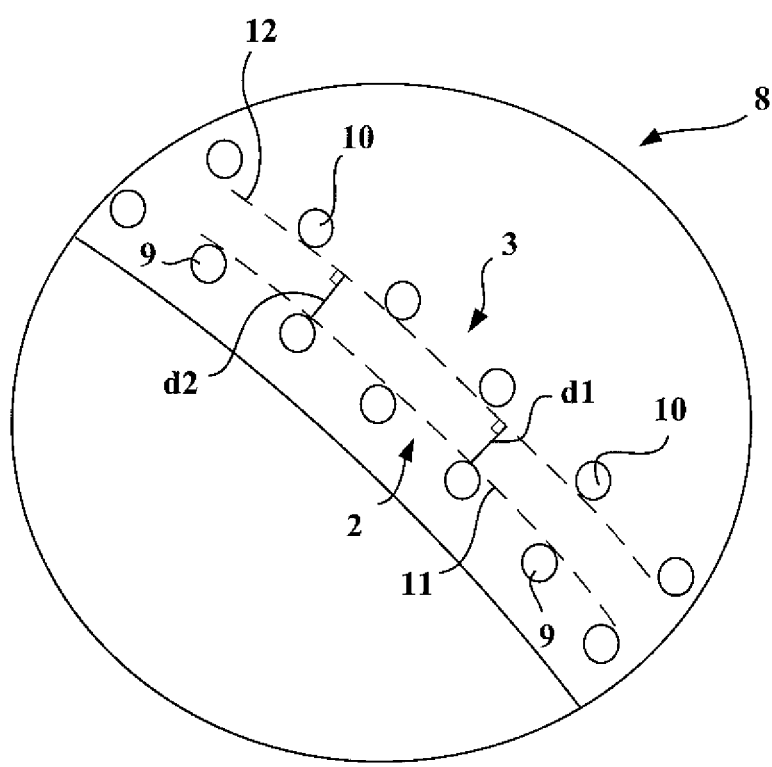

FIG. 2 is an enlargement of the region 8 and indicates the distance between the two layers of the carcass reinforcement 2, 3 in a region corresponding to the rubber compound 62.

The carcass reinforcement layer 2 comprises reinforcing elements 9 and the carcass reinforcement layer 3 comprises reinforcing elements 10.

The distance between the reinforcing elements 9 and 10 of each of the layers 2, 3 is measured from reinforcing element 9 to reinforcing element 10 along the orthogonal projection of a point on the radially outermost curvilinear abscissa 11 of the layer 2 of reinforcing elements 9 onto the radially innermost curvilinear abscissa 12 of the layer 3 of reinforcing elements 10.

The distances d1 and d2 shown in FIG. 2 are equal to 0.4 mm. In accordance with the invention this distance is between 0.2 and 0.5 mm across at least 60% of the axial width of the region corresponding to the rubber compound 62.

Figure 3:
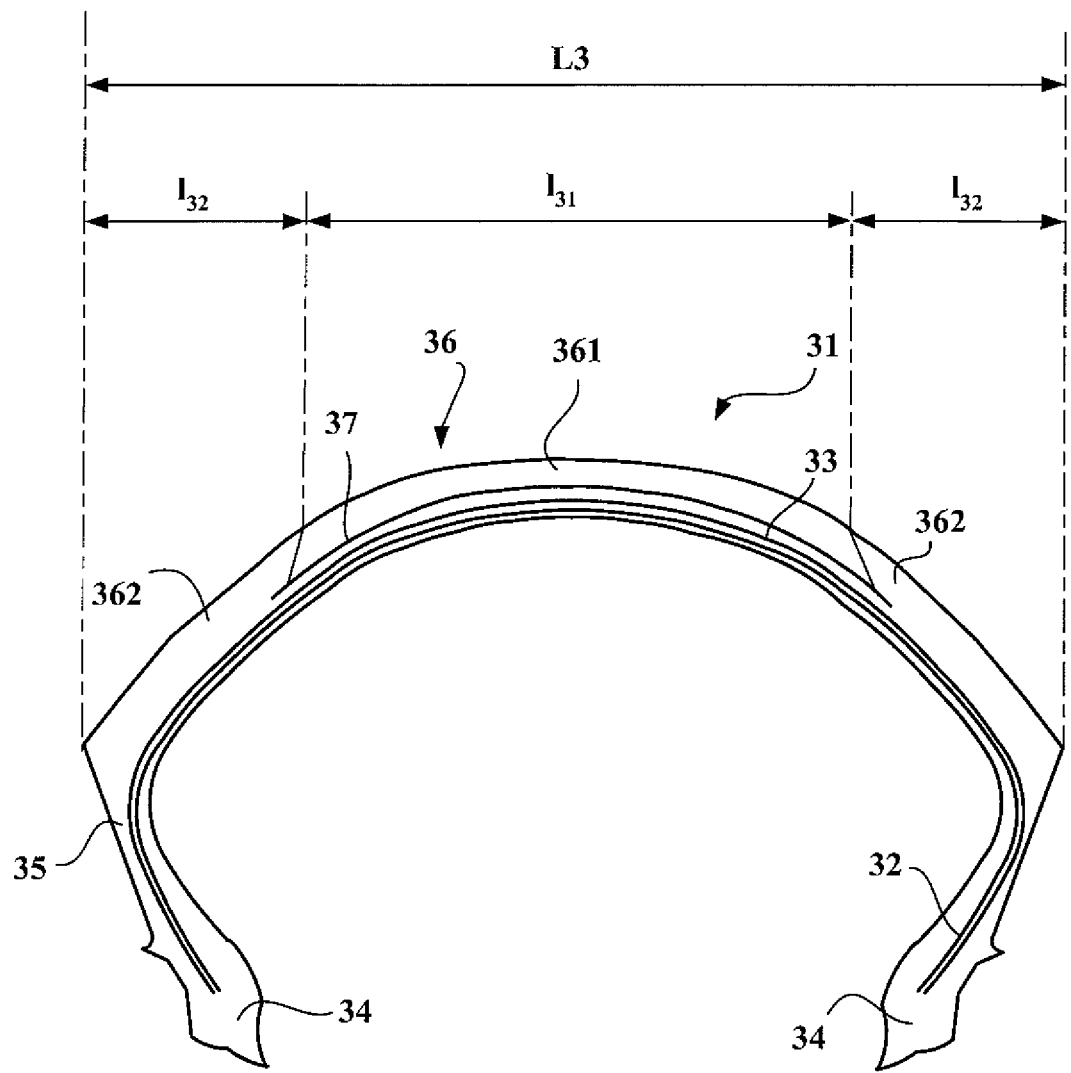

FIG. 3 shows a 120/70 ZR 17 type tire 31 intended to be fitted to the front wheel of a motorcycle. This tire 31 is similar to that shown in FIG. 1, from which it differs in part by having angles of the reinforcing elements of the carcass reinforcement layers in the equatorial plane equal to 72°.

The tire 31 also differs from that shown in FIG. 1 in that the axial widths of the central and lateral regions correspond to the rubber compounds 361 and 362, respectively.

The axial width $I_{31}$ of the central part corresponding to the rubber compound 361 is equal to 73.6 mm and represents approximately 61% of the axial width L3 of the tread, which is equal to 120 mm.

The axial widths $I_{32}$ of each of the lateral parts corresponding to the rubber compound 362 are identical and equal to 23.2 mm and represent approximately 19% of the axial width L3 of the tread.

The invention should not be understood to be limited to the description of the examples given above and extends in particular to tires that may have more complex carcass or crown reinforcements comprising for example three or more, working layers of reinforcing elements forming an angle with the circumferential direction.

We claim:

1. A tire for a motorized two-wheeled vehicle,
   comprising a carcass-type reinforcing structure formed of at least two layers of reinforcing elements and anchored on each side of the tire to a bead whose base is intended to be mounted on a wheel rim seat, each bead being continued radially outward by a sidewall, the sidewalls being joined radially outward to a tread, and
   comprising underneath the tread a crown reinforcement structure comprising at least one layer of reinforcing elements,
   wherein at least a surface of the tread comprises a first polymeric compound extending in at least a region of an equatorial plane and at least one second polymeric compound having physicochemical properties different from those of said first polymeric compound,
   wherein the reinforcing elements of said at least two layers forming the carcass-type reinforcing structure form angles with the circumferential direction of between 70° and 85°,
   wherein density of reinforcing elements in a radially inner layer of the at least two carcass reinforcement layers is less than that in a radially outer layer of the at least two carcass reinforcement layers, and wherein a distance between the reinforcing elements of each of said at least two layers forming the carcass-type reinforcing structure is not more than 0.5 mm across at least 60% of an axial width of at least one region composed of the second polymeric compound and wherein the at least two layers of reinforcing elements of the carcass-type reinforcing structure include a first layer and a second layer having different lengths and different calendaring thickness, wherein the length of the first layer is longer than the length of the second layer, and wherein the calendaring thickness of the first layer is thinner than the calendaring thickness of the second layer.

2. The tire according to claim 1, wherein the second polymeric compound is of a different composition from that of the first polymeric compound.

3. The tire according to claim 1, wherein the second polymeric compound has grip properties superior to those of the first polymeric compound.

4. The tire according to claim 1, wherein the second polymeric compound has a Shore A hardness less than that of the first polymeric compound.

5. The tire according to claim 1, wherein the distance between the reinforcing elements of each of said at least two layers forming the carcass-type reinforcing structure is more than 0.2 mm across the at least 60% of the axial width of the at least one region composed of the second polymeric compound.

6. The tire according to claim 1, wherein the tire is intended to be fitted to the rear wheel of the vehicle, and wherein the region of the tread surface formed by the first polymeric compound has an axial width of between 15 and 30% of the axial width of the tread.

7. The tire according to claim 1, wherein the tire is intended to be fitted to the front wheel of the vehicle, and wherein the region of the tread surface formed by the first polymeric compound has an axial width of between 45 and 70% of the axial width of the tread.

8. The tire according to claim 1, wherein the crown reinforcement structure comprises at least one layer of circumferential reinforcing elements.

9. The tire according to claim 1, wherein the crown reinforcement structure comprises at least first and second layers of reinforcing elements, and wherein from the first layer to the second layer the reinforcement elements form angles with each other of between 20° and 160°.

10. The tire according to claim 1, wherein the distance between the reinforcing elements of each of said at least two layers forming the carcass-type reinforcing structure is measured from a reinforcing element of a first, radially inner layer of said at least two layers to a reinforcing element of a second, radially outer layer of said at least two layers that is adjacent to the first layer along an orthogonal projection of a point on a radially outermost curvilinear abscissa of the first layer onto a radially innermost curvilinear abscissa of the second layer.

* * * * *